Patented Oct. 10, 1933

1,930,257

UNITED STATES PATENT OFFICE 1,930,257

PREPARATION OF BEVERAGES

Willy Stelkens, Koeln, Germany, assignor to Albert T. Otto & Sons, New York, N. Y., a corporation of New York No Drawing. Application June 27, 1930, Serial No. 464,324, and in Germany July 2, 1929

4 Claims. (Cl. 99—11)

This invention relates to the preparation of beverages by making an infusion of vegetable matter such as roasted coffee or tea leaves, and has for its object the more effective removal of caffein, theine and certain other detrimental substances.

As one of the main features of my invention, I effect the extraction of the deleterious substances from the coffee or tea at the same time that an extract or a beverage prepared therefrom, as distinguished from those processes wherein the detrimental substances are removed from the coffee or tea during its preparation as a commercial product or removed from the infusion after the latter has been made.

It has been proposed to prepare either a concentrated extract or a beverage from tea leaves or ground coffee by subjecting such solid to the action of water heated preferably to the boiling point, and thereafter passing the resultant solution through a suitable filtering bed including materials capable of absorbing the detrimental substances to be separated.

Such process, however, is successful only within a certain temperature range, and requires the use of filtering beds of a predetermined dimension, character and filtering speed, having a specific relation to the volume of the resultant fluid and the character of the coffee or tea employed, and these specific relations must be observed in order to obtain the highest efficiency in the separation of the detrimental substances. Also in said process, the filtering step requires considerable time, and the entire process is materially slowed up thereby.

It is an object of the present invention to provide a new process for the separation of detrimental substances from coffee and tea during the process of infusion employed in the making of an extract or beverage therefrom.

It is a further object of the invention to utilize certain materials having absorbent qualities, in a novel manner whereby the detrimental substances are removed in greater quantities than is possible in the commonly used process heretofore mentioned.

A further object of the invention resides in a novel manner of subjecting the coffee or tea to be treated to the action of absorbent materials whereby the necessity for subjecting a resulting extract or beverage to the action of a filtering operation is entirely obviated.

With the above and other objects in view, the invention broadly stated, contemplates the combining of certain materials having certain absorbent qualities directly with the coffee or tea to be treated prior to the process of making an extract or beverage therefrom.

In carrying out the process in accordance with the present invention, a suitable solid absorbent of which activated carbon (zinc-chlorid-activated-carbon) is one example, is mixed directly with the roasted coffee or the tea leaves to be treated, it being understood that when treating coffee it is preferably ground or pulverized to the desired degree in any well known manner.

In order to obtain a thorough intermixing of the coffee or tea and the absorbents, the latter should be reduced to the smallest possible grain size, thus insuring a thorough distribution of the absorbents throughout the coffee or tea with which they are combined. It is also desirable that other elements be not added to the combined coffee or tea and absorbent, such as would prevent the absorbent from precipitating to the bottom of the mixture after the infusion thereof has been completed. While it is desirable that the materials and apparatus employed in the manufacture of the beverage be such that the absorbents may settle in the liquid resulting from the infusion, this is not necessary since the absorbents may be separated from the resulting liquid by means of suitable straining operations.

In order to avoid as much as possible the settling of the extracted substances on the added absorbent, it is advisable to precharge the absorbent before adding the same to the coffee or tea with a substance which is easily soluble in water, easily separated by heat and which preferably has no taste, or which imparts only a pleasant taste, such for example, as sweetening for the extract or beverage formed therefrom. It is also desirable that the material used for precharging the absorbent, be readily soluble in order to obtain the quickest possible exchange between the pre-absorbed substance and the particles containing detrimental substances to be separated, when bringing about an infusion of the mixture of coffee or tea and absorbent through infusion. It has been found that glycerine and carbo-hydrates soluble in water, have the aforementioned qualities and are highly adaptable for the purpose stated. It is to be understood, however, that precharging of the absorbents is not necessary to a successful operation of the process.

Example I

In practicing the process with uncharged absorbents, 40 gr. ground coffee is intimately mixed with 5 gr. finely granulated activated carbon (zinc-chlorid-activated-carbon) in the grain size from 0.2 to 0.4 m/m. The mixture, as commonly done when making a coffee infusion in any household, is first of all, infused with a small quantity of boiling water of about 100-299 ccm. and allowed to draw for approximately five minutes. Thereupon, the coffee infusion is diluted in the usual manner with hot water until the concentration is drinkable.

This coffee infusion has an agreeable taste, less bitter in comparison to a similar infusion made without the addition of activated carbon. An analysis of the coffee infusion shows that the infusion with the addition of activated carbon had 56% less caffein than the same infusion made without the addition of activated carbon, but passed through a filtering bed including absorbents. The nitrogen compounds which are produced during the process of roasting through the conversion of the albumen of the raw coffee bean, and which are deleterious substances as they have an unfavorable effect on the digestion, are absorbed by the activated carbon added to the coffee powder and the amount left in the solution is decreased 43%. The amount of extracted substance in the infusion decreased 12% in my process over the old process of merely treating the infusion with activated carbon.

Example II

When practicing the process using precharged absorbents, 40 gr. of ground coffee is intimately mixed with 10 gr. of activated carbon, grain size .02-0.4 m/m., which contains 5 gr. of absorbed glycerin—i. e. which is charged with 100% of its own weight of chemically purest glycerin. This is infused as per Example I.

This coffee infusion has a somewhat stronger taste than the infusion not employing precharged carbon, as per Example I. The analysis of the coffee infusion as per Example II showed a higher percentage of separated nitrogen substances than in the infusion as per Example I, i. e. in comparison to an infusion without the direct addition of absorbents, a decrease in caffein of approximately 71%. A decrease in the entire contents of nitrogen of approximately 54% was ascertained in the residue of the extracted coffee solution. A decrease of the extractive substances of approximately 2% in comparison to a coffee solution without the direct addition of carbon was ascertained.

The absorption of the extractive substances may also be kept down in such a way that a less highly activated carbon is added, for instance, in place of the zinc-chlorid-carbon, a lesser activated steam carbon may be employed. However, in this case, it is necessary to increase the quantity of the carbon to be added in order to obtain the same result, i. e. an approximate 70% elimination of caffein. In practice, it is necessary to choose the grade of activity of the carbon and the manner of precharging according to the character of the kind of coffee or tea to be treated, as they naturally, all react differently.

In addition to the foregoing advantages developed in connection with the separation of detrimental substances from the coffee or tea during the process of infusion, the mixing of the substance directly with the coffee or tea has another very decided advantage. It is well known that coffee and tea, particularly coffee in its ground or pulverized state, if not hermetically sealed, readily loses its volatile aromatic substances. It has been found in the actual practice of the process that the absorbents when mixed directly with ground or pulverized coffee, tend to absorb the volatile aromatic substances thereof and retain the same until such time as the coffee combined with the absorbents is subjected to the infusion process at which time, the volatile aromatic substances of the coffee are released from the absorbents by the infusion process, and the resultant extract or beverage is possessed of an aroma substantially equal to that of an extract or beverage produced from freshly ground coffee.

It will thus be seen that if the absorbents are mixed directly with ground or pulverized coffee, it is possible to store such coffee for a long period of time in non-hermetically sealed packages without loss of its volatile aromatic substances.

Having thus described my invention, what I claim as new and desire to secure by Letters Patent is:

1. A dry composition of matter for use in making a beverage, including an intimate mixture of tea or coffee and activated carbon in a fine state of subdivision, the activated carbon having glycerine absorbed therein.

2. A composition of matter for use in removing deleterious matter from tea or coffee in making a beverage, including activated carbon in a fine state of subdivision containing glycerine adsorbed therein.

3. A composition of matter for use in removing deleterious matter from tea or coffee in making a beverage, including activated carbon in a fine state of subdivision and approximately an equal weight of glycerine adsorbed therein.

4. A composition of matter for use in removing deleterious matter from tea or coffee in making a beverage, including activated carbon in a fine state of subdivision and containing a compound of the group comprising glycerine and carbohydrates readily soluble in water and having no taste, a pleasing taste or a sweet taste.

WILLY STELKENS.